(12) United States Patent
Fujio

(10) Patent No.: US 11,292,672 B2
(45) Date of Patent: Apr. 5, 2022

(54) DIVERGING/MERGING DEVICE FOR CONVEYING EQUIPMENT

(71) Applicant: Daifuku Co., Ltd., Osaka (JP)

(72) Inventor: Yoshihiko Fujio, Shiga (JP)

(73) Assignee: Daifuku Co., Ltd.

( * ) Notice: Subject to any disclaimer, the term of this patent is extended or adjusted under 35 U.S.C. 154(b) by 0 days.

(21) Appl. No.: 17/095,437

(22) Filed: Nov. 11, 2020

(65) Prior Publication Data
US 2021/0061580 A1    Mar. 4, 2021

Related U.S. Application Data

(63) Continuation of application No. PCT/JP2019/015155, filed on Apr. 5, 2019.

(30) Foreign Application Priority Data

Jun. 11, 2018  (JP) .............................. JP2018-110881

(51) Int. Cl.
*B65G 47/54*    (2006.01)
*B65G 47/64*    (2006.01)

(52) U.S. Cl.
CPC ............. *B65G 47/54* (2013.01); *B65G 47/64* (2013.01)

(58) Field of Classification Search
None
See application file for complete search history.

(56) References Cited

U.S. PATENT DOCUMENTS

| | | | | |
|---|---|---|---|---|
| 1,824,276 A | * | 9/1931 | Kesti .................... | B65G 13/10 |
| | | | | 193/36 |
| 2,136,267 A | * | 11/1938 | Taylor ................... | B65G 13/10 |
| | | | | 198/359 |
| 2,794,529 A | * | 6/1957 | Schmitz ................ | B65G 13/10 |
| | | | | 193/36 |

(Continued)

FOREIGN PATENT DOCUMENTS

| JP | H04101912 A | 4/1992 |
|---|---|---|
| JP | 04088423 U | 7/1992 |

(Continued)

*Primary Examiner* — Kavel Singh
(74) *Attorney, Agent, or Firm* — St. Onge Steward Johnston & Reens LLC

(57) ABSTRACT

A transportation equipment branch convergence device has a curving transportation device that tangentially connects to a straight track anchored at a fixed height so as to transport an object along the entirety of a curving track at the same level as the straight track. The straight track comprises a straight track section of a fixed length encompassing an entire area of overlap with the curving transportation device. A straight transportation device constituting this straight track section of fixed length comprises a vertical transportation mechanism that slopes in the vertical direction with pivot points at both ends of the straight track section. When the vertical transportation mechanism is in a downward sloping state, the straight transportation device is retracted beneath the transported object for transport. When the vertical transportation mechanism is in an upward sloping state, the transported object for transport passes over the curving transportation device.

14 Claims, 11 Drawing Sheets

(56) References Cited

U.S. PATENT DOCUMENTS

| | | | | |
|---|---|---|---|---|
| 3,343,639 A * | 9/1967 | Thure | ............... | B65G 13/10 |
| | | | | 193/36 |
| 3,785,469 A * | 1/1974 | Stumpf | ............ | B65G 13/10 |
| | | | | 193/36 |
| 5,653,325 A * | 8/1997 | Enomoto | ........ | B65G 13/10 |
| | | | | 193/36 |
| 6,179,113 B1 * | 1/2001 | Wunscher | ......... | B65G 13/10 |
| | | | | 198/436 |
| 9,266,677 B2 * | 2/2016 | Isomura | ........... | B65G 47/54 |
| 11,046,521 B2 * | 6/2021 | Fujio | ............... | B65G 13/06 |

FOREIGN PATENT DOCUMENTS

| | | | |
|---|---|---|---|
| JP | 2007223683 A | | 9/2007 |
| KR | 101710387 B1 | * | 2/2017 |

\* cited by examiner

DIVERGING/MERGING DEVICE FOR CONVEYING EQUIPMENT

TECHNICAL FIELD OF THE INVENTION

The present invention relates to a diverging/merging device for conveying equipment in which an arc-shaped path section at an end portion of another conveying path is tangentially connected in the middle of a straight path.

BACKGROUND OF THE INVENTION

For a diverging/merging device for conveying equipment of this kind, those having various configurations are known as means for switching conveying paths for conveyed objects as described in, for example, Japanese Published Unexamined Patent Application No. 2007-22368 (Patent Literature 1). In general, as described in Japanese Published Unexamined Patent Application No. 2007-223683 (Patent Literature 1), a configuration has been conceived in which an arc-shaped conveying device (of a roller conveyor type, of a belt conveyor type, etc.) forming the arc-shaped path section and a linear conveying device (of a roller conveyor type, of a belt conveyor type, etc.) forming a constant length straight path section including an entirety of an overlapping area with the arc-shaped path section are configured to be relatively vertically movable and are controlled such that the arc-shaped conveying device is raised to an upper working position and the other linear conveying device is lowered to a lower retracted position when the arc-shaped path section is desired to be used and the linear conveying device is raised to the upper working position and the other arc-shaped conveying device is lowered to the lower retracted position when the linear path section is desired to be used, and the linear conveying device and the arc-shaped conveying device are caused to function alternatively. Further, a configuration is also generally known in which a main conveying path is set to the straight path section and the linear conveying device is fixed at a usable level and only the arc-shaped conveying device forming the arc-shaped path section serving as a secondary conveying path is moved up and down.

SUMMARY OF THE INVENTION

In any of the configurations, when a conveyed object, for example, a tray loaded with an object, is diverged and conveyed, for example, from the straight path to the arc-shaped path section, the arc-shaped conveying device on the upstream side is in such a state that it is raised with respect to the linear conveying device on the downstream side. As a result, the tray having a hard and flat bottom surface is transferred from the top of the horizontal linear conveying device onto the raised arc-shaped conveying device. Thus, the inclination angle gradually increases as the tray is transferred onto the arc-shaped conveying device, and the tray is finally transferred onto the arc-shaped conveying device in such a manner as to fall with a thud. This phenomenon becomes more noticeable and flapping of the tray also becomes larger as the conveying speed increases, or when the center of the gravity of the tray is closer to the rear due to the loaded object, or as the length of the tray is longer. Such flapping of the tray makes the trajectory at the time the tray is transferred onto the arc-shaped conveying device unstable, and the trajectory of the tray bulges outward to strongly press the tray against an outer arc-shaped guide of the arc-shaped path section, and in some cases, the possibility of diverging failure arises.

The present invention proposes a diverging/merging device for conveying equipment capable of solving the conventional problem as described above. Described by giving reference signs in parentheses used in the description of an embodiment described below in order to facilitate understanding the relationship with the embodiment, the diverging/merging device for conveying equipment according to the present invention is a diverging/merging device for conveying equipment in which an arc-shaped path section (6) at an end portion of another conveying path (3, 5) is tangentially connected in a middle of a straight path (1A, 1B) and an arc-shaped conveying device (8) forming the arc-shaped path section (6) is fixed at a constant height so that a conveyed object can be conveyed over an entire area of the arc-shaped path section (6) at the same level as the straight path (1A, 1B) tangentially connected with the arc-shaped path section (6), in which the straight path (1A, 1B) includes a constant length straight path section (7) including an entirety of an overlapping area (6a) with the arc-shaped path section (6) from a connection position (P) with the arc-shaped path section (6), and a linear conveying device (9) forming the constant length straight path section (7) includes vertically moving conveyance means (17, 19) tilting in a vertical direction with respect to an end portion of the straight path (1A, 1B) tangentially connected with the arc-shaped path section (6), and when the vertically moving conveyance means (17, 19) are at a lower retracted position of tilting downward, the linear conveying device (9) is located below a conveyed object conveyed by the arc-shaped conveying device (8), and when the vertically moving conveyance means (17, 19) are at an upper working position of tilting upward, a conveyed object conveyed by the linear conveying device (9) passes above the arc-shaped conveying device (8).

The foregoing configuration of the present invention has the greatest feature in that the straight path is not set as the main conveying path but the arc-shaped path section is set as the main conveying path. The arc-shaped conveying device forming the arc-shaped path section is fixed at a constant height so that the conveyed object can be conveyed over the entire area of the arc-shaped path section at the same level as the straight path tangentially connected with the arc-shaped path section. Thus, described by using a tray having a flat and hard bottom surface as the conveyed object, when the tray is diverged/merged between the straight path and the arc-shaped path section, a situation in which the tray transferred between the straight path and the arc-shaped conveying device is obliquely transferred straddling the straight path and the arc-shaped conveying device as in the conventional case is not caused by simply holding the vertically moving conveyance means of the linear conveying device forming the constant length straight path section at the lower retracted position, even if the conveyed object conveyed by the arc-shaped conveying device is the tray whose bottom surface is hard and flat as described above. As a result, the transfer and change of direction of the tray between the straight path and the arc-shaped conveying device are performed stably without flapping in exactly the same manner as the conveyance of the tray at a normal horizontal curved path section in which two straight paths are connected by an arc-shaped conveying path, and increasing the conveying speed is also facilitated. As a matter of course, the possibility that the tray is strongly pressed against a tray guide on the side of the conveying path or stopped is also eliminated.

On the other hand, when the tray is made to travel straight ahead on the straight path, the vertically moving conveyance means of the linear conveying device forming the constant length straight path section are switched from the lower retracted position to the upper working position and the tray is made to pass and move in such a manner as to straddle over the arc-shaped conveying device. Since the vertically moving conveyance means which was switched to the upper working position are only connected at an angle with respect to the straight path in side view and the straight path is maintained in plan view, the tray travels straight ahead between the straight path and the vertically moving conveyance means accompanied by inertia in the straight-ahead direction even if a situation in which the tray is obliquely supported between the straight path and the vertically moving conveyance means occurs. There is no possibility that variations occur in the moving direction of the tray and the tray is unduly pressed against the tray guide on the side of the conveying path or stopped. Since the vertically moving conveyance means are only required to be provided to the linear conveying device side, the configuration of the entire device is simplified and can be implemented inexpensively as compared with a configuration that the vertically moving conveyance means are provided to both the arc-shaped conveying device and the linear conveying device and the both need to be moved upward and downward reversibly.

When the foregoing present invention is implemented, the linear conveying device (9) can be structured to include first vertically moving conveyance means (17, 19) tilting in the vertical direction with respect to one end of the constant length straight path section (7) and a second vertically moving conveyance means (20) tilting in the vertical direction with respect to the other end of the constant length straight path section (7), and when both the first and second vertically moving conveyance means (17, 19, 20) are at the upper working position, a conveying surface on the linear conveying device (9) can be configured to be deformed in a mountain shape in which an intermediate part is raised. According to this configuration, there is no need to make a difference in level in conveying path height before and after the constant length straight path section as in the case where the constant length straight path section is formed of only one vertically moving conveyance means in side view, and it becomes possible to incorporate the diverging/merging device into an existing straight path.

Further, the linear conveying device (9) can be formed of an outer linear drive conveyor unit (12) on a side farther from an arc center of the arc-shaped path section (6) and an inner linear drive conveyor unit (13) on a side closer to the arc center, and the arc-shaped conveying device (8) can be formed of an arc-shaped drive roller array (10) on a side farther from the arc center and an arc-shaped idler roller array (11) on a side closer to the arc center. The arc-shaped drive roller array (10) can have its one end arranged at a position adjacent, on a side where the arc center is located, to one end of the outer linear drive conveyor unit (12) and have its intermediate portion arranged so as to cross an intermediate position of the inner linear drive conveyor unit (13). The arc-shaped idler roller array (11) can have its one end arranged at a position adjacent, on a side where the arc center is located, to one end of the inner linear drive conveyor unit (13). The outer linear drive conveyor unit (12) can be formed of an outer vertically moving conveyance means (17) forming the area (6a) overlapping with the arc-shaped path section (6) and an outer non-vertically-moving conveyance means (18) forming an outside of the area (6a). The outer non-vertically-moving conveyance means (18) can be fixed at a height such that the outer non-vertically-moving conveyance means (18) is connected to the outer vertically moving conveyance means (17) when at the upper working position. The inner linear drive conveyor unit (13) can have its entire length formed of an inner vertically moving conveyance means (19, 20).

According to this configuration, similar to the inner linear drive conveyor unit, the structure is simplified and can be implemented inexpensively as compared with the case in which the entire length of the outer linear drive conveyor unit of the linear conveying device is formed of the vertically moving conveyance means. Further, the arc-shaped drive roller array of the arc-shaped conveying device is located while biased toward a side closer to an arc-shaped center line of the arc-shaped conveying path section, so that the degree of reduction in the conveying speed of the tray conveyed along the arc-shaped conveying path section can be suppressed.

At the connection position (P), conveyed object support levels of the straight path (1A, 1B) and the arc-shaped conveying device (8) and the linear conveying device (9) can be configured to be the same. The outer vertically moving conveyance means (17) can have one end on the connection position (P) side pivotally supported so as to be vertically movable and the other end supported by a support height changeable first support means (29). The inner vertically moving conveyance means (19, 20) can have its entire length divided into two parts and be formed of a first inner vertically moving conveyance means (19) on the connection position (P) side and a second inner vertically moving conveyance means (20) on the opposite side, and the first inner vertically moving conveyance means (19) and the second inner vertically moving conveyance means (20) can have respective inner end portions adjacent to each other supported by a support height changeable second support means (30) and third support means (31) and have respective outer end portions on the opposite side pivotally supported so as to be vertically movable. Specifically, the first support means (29), the second support means (30), and the third support means (31) can be respectively composed of rotary cams (29c to 31c) attached to one common drive shaft (22) and cam follower rollers (29b to 31b) respectively supported by the rotary cams (29c to 31c).

Furthermore, to one end on the connection position (P) side of the constant length straight path section (7), a first driving rotary shaft (21) can be supported along a path transverse direction, and to the other end on a side opposite to the connection position (P) side of the constant length straight path section (7), a second driving rotary shaft (23) can be supported in the path transverse direction. The outer vertically moving conveyance means (17) and the first inner vertically moving conveyance means (19) can be supported by the first driving rotary shaft (21) so as to be vertically movable, and the second inner vertically moving conveyance means (20) can be supported by the second driving rotary shaft (23) so as to be vertically movable. Drive rollers (17a) forming the outer vertically moving conveyance means (17), drive rollers (19a) forming the first inner vertically moving conveyance means (19), and drive rollers (10a) of the arc-shaped drive roller array (10) can be interlockingly coupled to the first driving rotary shaft (21), and drive rollers (18a) forming the outer non-vertically-moving conveyance means (18) and drive rollers (20a) forming the second inner vertically moving conveyance means (20) can be interlockingly coupled to the second driving rotary shaft (23). According to this configuration, the driving rotary shafts for driving the respective drive rollers can also be used as support shafts pivotally supporting one end portions of respective vertically moving conveyance means, and the number of parts can be reduced.

When the foregoing configuration is adopted, the drive rollers (20a) forming the second inner vertically moving conveyance means (20) can be provided only outside the arc-shaped drive roller array (10), and idler rollers (20c) can be provided at an area inner than the arc-shaped drive roller array (10) of the second inner vertically moving conveyance means (20). With this configuration, the configuration of the second inner vertically moving conveyance means can be simplified to reduce the cost.

Furthermore, one end drive roller (19a) forming a drive roller array of the first inner vertically moving conveyance means (19) and one end drive roller (10a) forming the arc-shaped drive roller array (10) can be attached to the first driving rotary shaft (21), and the drive roller (17a) at one end on the connection position (P) side of a drive roller array of the outer vertically moving conveyance means (17) and an idler roller (11b) at one end on the connection position (P) side of the arc-shaped idler roller array (11) can be separated from the first driving rotary shaft. According to this configuration, the function of the idler roller to be arranged at one end on the connection position side of the arc-shaped idler roller array can be supplemented by the one end drive roller forming the drive roller array of the first inner vertically moving conveyance means, and the function of the drive roller to be arranged at one end of the connection position side of the drive roller array of the outer vertically moving conveyance means can be supplemented by the one end drive roller forming the arc-shaped drive roller array, so that the number of parts can be reduced to reduce the cost.

DETAILED DESCRIPTION OF THE INVENTION

Figure 1:
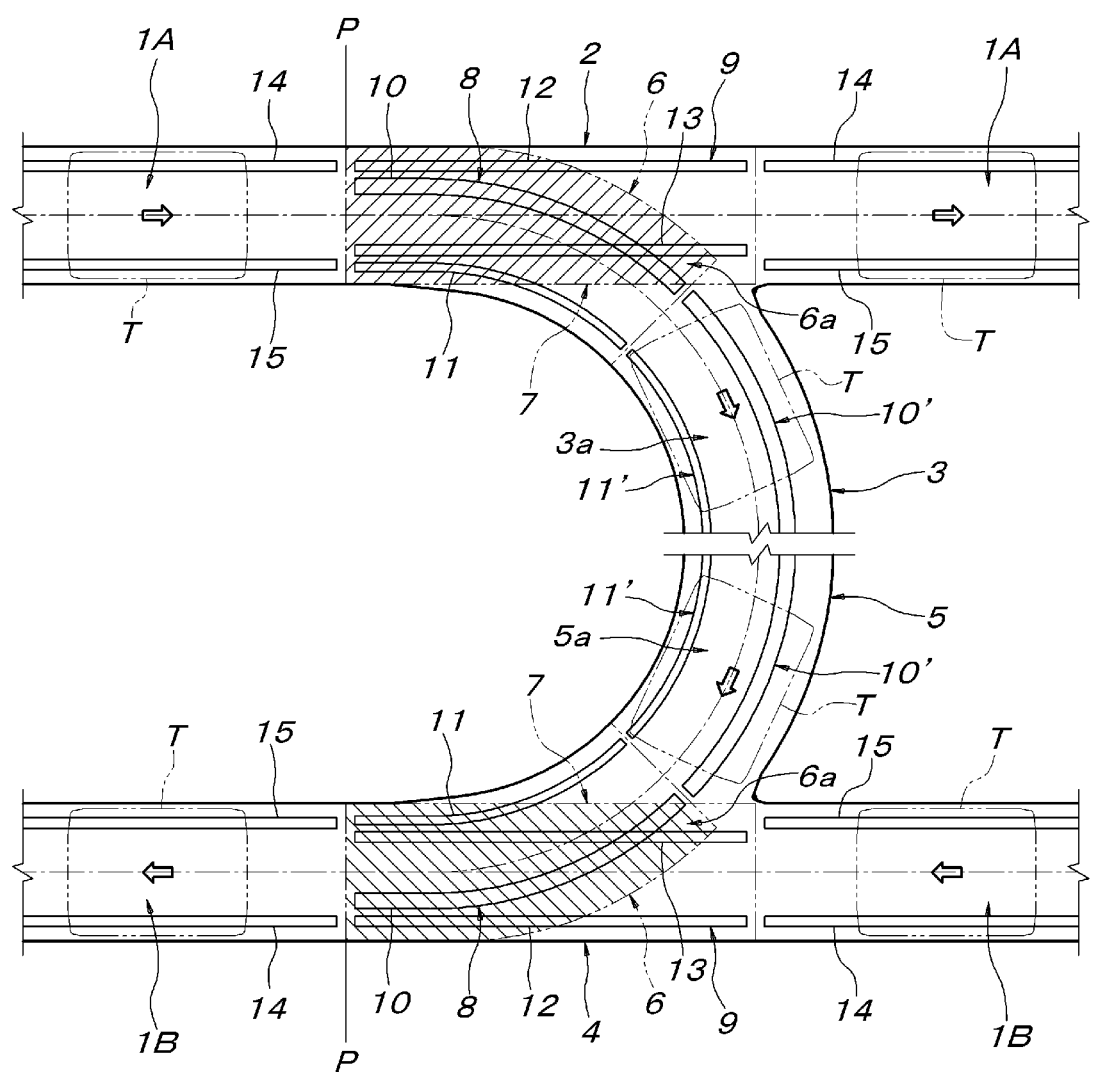
FIG. 1 is a schematic plan view explaining a layout of conveying equipment in which a diverging device and a merging device are combined.
Figure 2:
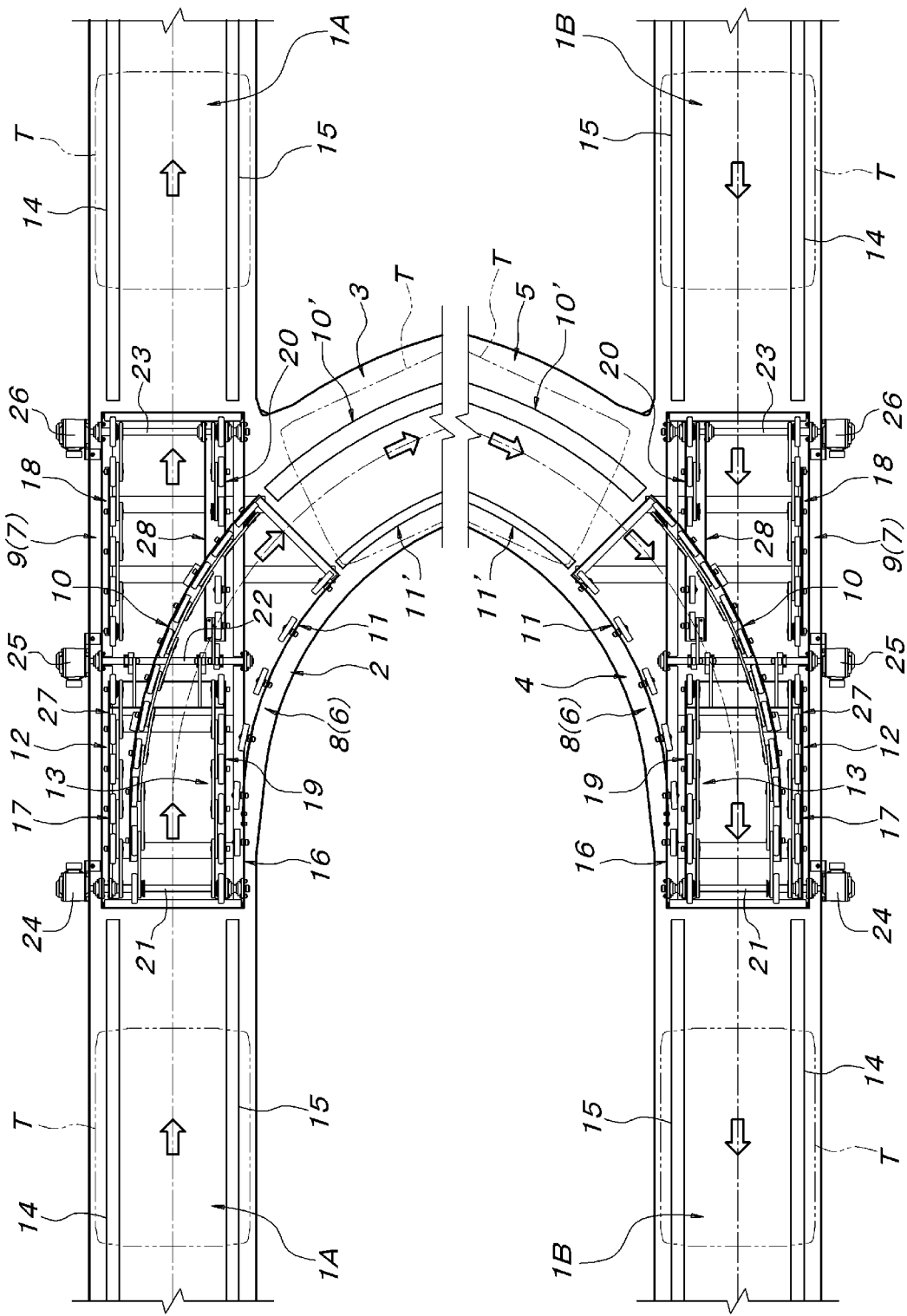
FIG. 2 is a plan view showing a specific structure of the diverging device and the merging device of FIG. 1.

In FIG. 1 and FIG. 2, reference signs 1A and 1B denote straight paths. To the straight path 1A, another conveying path 3 is diverged and connected from the middle of the straight path 1A via a diverging device 2. To the straight path 1B, another conveying path 5 is merged and connected in the middle of the straight path 1B via a merging device 4. The diverging device 2 and the merging device 4 have the same structure except that the conveying direction of the conveyed object is reverse, and include an arc-shaped path section 6 and a constant length straight path section 7. The arc-shaped path section 6 is connected to a connection end portion with the straight path 1A, 1B of another conveying path 3, 5, tangentially connects in the middle of the straight path 1A, 1B, and includes an arc-shaped conveying device 8. The constant length straight path section 7 is a part of the straight path 1A, 1B having a length including an entirety of an overlapping area 6a with the arc-shaped path section 6 from a connection position P between the straight path 1A, 1B and the arc-shaped path section 6, and includes a linear conveying device 9.

The arc-shaped conveying device 8 is formed of an arc-shaped drive roller array 10 on a side farther from the arc center of the arc-shaped path section 6 and an arc-shaped idler roller array 11 on a side closer to the arc center. The linear conveying device 9 is formed of an outer linear drive conveyor unit 12 on a side farther from the arc center of the arc-shaped path section 6 and an inner linear drive conveyor unit 13 on a side closer to the arc center. An outer drive conveyor unit 14 and an inner drive conveyor unit 15 are arranged side by side bilaterally symmetrically at the straight paths 1A, 1B excluding the diverging device 2 and the merging device 4. The outer linear drive conveyor unit 12 of the linear conveying device 9 is arranged at a position linearly connecting to the outer drive conveyor unit 14 of the straight path 1A, 1B at both front and rear sides of the outer linear drive conveyor unit 12. The inner linear drive conveyor unit 13 of the linear conveying device 9 is arranged at a position closer to an inner side (a side where the outer linear drive conveyor unit 12 is located) than a position linearly connecting to the inner drive conveyor unit 15 of the straight path 1A, 1B at both front and rear sides of the inner linear drive conveyor unit 13.

The arc-shaped drive roller array 10 of the arc-shaped conveying device 8 has one end arranged at a position adjacent, on the side where the arc center is located, to one end of the outer linear drive conveyor unit 12 and has an intermediate portion arranged so as to cross an intermediate position of the inner linear drive conveyor unit 13. The arc-shaped idler roller array 11 has one end arranged at a position adjacent, on the side where the arc center is located, to one end of the inner linear drive conveyor unit 13. The conveying path 3, 5 includes an arc-shaped path section 3a, 5a continuing to the arc-shaped path section 6 of the diverging device 2 or the merging device 4. The arc-shaped path section 3a, 5a includes an arc-shaped drive roller array 10' connected to the arc-shaped drive roller array 10 of the arc-shaped conveying device 8 provided to the arc-shaped path section 6 and an arc-shaped idler roller array 11' connected to the arc-shaped idler roller array 11 of the arc-shaped conveying device 8. However, the arc-shaped path section 3a, 5a is not essential and a configuration that a linear path section is connected may be adopted. That is, when the conveying path 3, 5 is composed of a linear path section, the linear path section can be configured in the same manner as the configuration of the straight path 1A, 1B provided with the outer drive conveyor unit 14 and the inner drive conveyor unit 15.

The detailed structure of the diverging device 2 will be described based on FIG. 3 to FIG. 9. The diverging device 2 is incorporated into an installation frame body 16 having a rectangular shape in plan view, inside of which the outer linear drive conveyor unit 12 and the inner linear drive conveyor unit 13 of the linear conveying device 9 are arranged side by side. The outer linear drive conveyor unit 12 has its entire length divided into two parts and is composed of an outer vertically moving conveyance means 17 of the front half on the connection position P side and an outer non-vertically-moving conveyance means 18 of the rear half. The inner linear drive conveyor unit 13 has its entire length divided into two parts and is composed of a first inner vertically moving conveyance means 19 of the front half on the connection position P side and a second inner vertically moving conveyance means 20 of the rear half. A first rotary drive shaft 21 and a second rotary drive shaft 23 are supported by an end portion on the connection position P side and an end portion opposite thereto of the installation frame body 16, and a third rotary drive shaft 22 is supported by a central portion in the length direction of the installation frame body 16. Each of the rotary drive shafts 21 to 23 is supported in an orientation of traversing the conveying path, and to an end portion on a side opposite to a side where the arc-shaped path section 6 is located, an output shaft of each of driving motors 24 to 26 is directly connected outside the installation frame body 16. Each of the driving motors 24 to 26 is coupled to the installation frame body 16 by a coupling member 24a to 26a in order to prevent the motor itself from rotating around the rotary drive shafts 21 to 23.

To the first rotary drive shaft 21, one end of a movable frame 27 is vertically movably supported with the first rotary drive shaft 21 as a supporting point. To the second rotary drive shaft 23, one end of a movable frame 28 is vertically movably supported with the second rotary drive shaft 23 as a supporting point. The movable frame 27 extends from the first rotary drive shaft 21 toward the central third rotary drive shaft 22 and is composed of a pair of left and right side frames 27a, 27b and a coupling frame 27c coupling and integrating free end portions of both side frames 27a, 27b together. To the outer side frame 27a, the outer vertically moving conveyance means 17 is attached, and inside the inner side frame 27b, the first inner vertically moving conveyance means 19 is attached. The outer vertically moving conveyance means 17 is composed of drive rollers 17a pivotally supported inside the side frame 27a at regular intervals and transmission belts 17b interlockingly coupling adjacent drive rollers 17a together using double pulleys consecutively provided concentrically and integrally to respective drive rollers 17a. The drive roller 17a on the first rotary drive shaft 21 side is separated from the first rotary drive shaft 21 by about one pitch between the drive rollers 17a. Thus, the drive roller 17a adjacent to the first rotary drive shaft 21 is interlockingly coupled to the first rotary drive shaft 21 by an additional belt transmission means 17c. Therefore, all of the drive rollers 17a of the outer vertically moving conveyance means 17 are interlockingly driven by the rotation of the first rotary drive shaft 21.

The first inner vertically moving conveyance means 19 is composed of drive rollers 19a pivotally supported inside the side frame 27b at regular intervals so as to form a left/right pair with the drive rollers 17a and transmission belts 19b interlockingly coupling adjacent drive rollers 19a together using double pulleys consecutively provided concentrically and integrally to respective drive rollers 19a. The drive roller 19a is also attached to the first rotary drive shaft 21. Therefore, all of the drive rollers 19a of the first inner vertically moving conveyance means 19 are interlockingly driven by the rotation of the first rotary drive shaft 21.

So as to be arranged in series with the outer vertically moving conveyance means 17 in a straight line, the outer non-vertically-moving conveyance means 18 is composed of drive rollers 18a pivotally supported inside the installation frame body 16 at regular intervals and transmission belts 18b interlockingly coupling adjacent driver rollers 18a together using double pulleys consecutively provided concentrically and integrally to respective drive rollers 18a. The drive roller 18a at an end on the second rotary drive shaft 23 side is also attached to the second rotary drive shaft 23. Thus, all of the drive rollers 18a of the outer non-vertically-moving conveyance means 18 are interlockingly driven by the rotation of the second rotary drive shaft 23.

The second inner vertically moving conveyance means 20 is composed of a drive roller array 20A and an idler roller array 20B attached to the movable frame 28 extending from the second rotary drive shaft 23 toward the central third rotary drive shaft 22. The drive roller array 20A is arranged at a rear half area from an area crossing the arc-shaped drive roller array 10 of the arc-shaped conveying device 8 to the second rotary drive shaft 23. The drive roller array 20A is composed of drive rollers 20a arranged at regular intervals so as to form a left/right pair with the drive rollers 18a of the outer non-vertically-moving conveyance means 18 and transmission belts 20b interlockingly coupling adjacent drive rollers 20a together using double pulleys consecutively provided concentrically and integrally to respective drive rollers 20a. The drive roller 20a is also attached to the second rotary drive shaft 23 in the same manner as the outer non-vertically-moving conveyance means 18, and all of the drive rollers 20a (two drive rollers 20a in the illustrated example) in the drive roller array 20A are interlockingly driven by the rotation of the second rotary drive shaft 23. The idler roller array 20B is formed of idler rollers 20c (two idler rollers 20c in the illustrated example) pivotally supported, at regular intervals, by the movable frame 28 from the area crossing the arc-shaped drive roller array 10 of the arc-shaped conveying device 8 to a free end on the third rotary drive shaft 22 side so as to form a left/right pair with the drive rollers 18a of the outer non-vertically-moving conveyance means 18.

To the outer vertically moving conveyance means 17, the first inner vertically moving conveyance means 19, and the second inner vertically moving conveyance means 20, a support height changeable first support means 29, second support means 30, and third support means 31 switching the height of the conveying means between a lower retracted position and an upper working position are juxtaposed. The first support means 29 and the second support means 30 are formed of arms 29a, 30a arranged at positions closer to both left and right ends of a free end (an end portion on a side adjacent to the central third rotary drive shaft 22) of the movable frame 27 supporting the outer vertically moving conveyance means 17 and the first inner vertically moving conveyance means 19 so as to extend toward the upper side of the third rotary drive shaft 22, cam follower rollers 29b, 30b pivotally supported by free ends of both the arms 29a, 30a, and rotary cams 29c, 30c attached to the third rotary drive shaft 22 so as to support both the cam follower rollers 29b, 30b. The third support means 31 is formed of an arm 31a arranged at a free end (an end portion on a side adjacent to the central third rotary drive shaft 22) of the movable frame 28 supporting the second inner vertically moving conveyance means 20 so as to extend toward the upper side of the third rotary drive shaft 22, a cam follower roller 31b pivotally supported by a free end of the arm 31a, and a rotary cam 31c attached to the third rotary drive shaft 22 so as to support the cam follower roller 31b.

The arc-shaped drive roller array 10 of the arc-shaped conveying device 8 is composed of an outer arc-shaped side frame 33 supported at a constant height by a plurality of support frames 32a to 32d disposed so as to connect lower sides of both left and right side frames 16a, 16b of the installation frame body 16, drive rollers 10a pivotally supported by the outer arc-shaped side frame 33 at regular intervals, and transmission belts 10b interlockingly coupling adjacent drive rollers 10a together using double pulleys consecutively provided concentrically and integrally to respective drive rollers 10a. The outer arc-shaped side frame 33 has an end on the first rotary drive shaft 21 side separated from the first rotary drive shaft 21. Therefore, the drive roller 10a arranged at the end on the first rotary drive shaft 21 side of the arc-shaped drive roller array 10 is attached to the first rotary drive shaft 21. Thus, all of the drive rollers 10a of the arc-shaped drive roller array 10 are interlockingly driven by the rotation of the first rotary drive shaft 21.

Since the arc-shaped drive roller array 10 crosses the second inner vertically moving conveyance means 20 of the linear conveying device 9 and the inner side frame 16b of the installation frame body 16, notched portions 28a, 16c are respectively provided to a place where the movable frame 28 supporting the second inner vertically moving conveyance means 20 interferes with the arc-shaped drive roller array 10 at the time of moving up and down and swinging and a place where the inner side frame 16b of the installation frame body 16 interferes with the arc-shaped drive roller array 10. The coupling frame 27c of the movable frame 27 and the third rotary drive shaft 22 crossing the arc-shaped drive roller array 10 in plan view are provided lower than the arc-shaped drive roller array 10, so that they do not interfere with each other.

The arc-shaped idler roller array 11 of the arc-shaped conveying device 8 is formed of idler rollers 11a pivotally supported, at appropriate intervals, by an inner arc-shaped side frame 34 concentric with the outer arc-shaped side frame 33 forming the arc-shaped drive roller array 10 and an idler roller 11b pivotally supported by the inner side frame 16b of the installation frame body 16. The inner arc-shaped side frame 34 is such that an inner end portion inserted inside the inner side frame 16b of the installation frame body 16 from a notched portion 16d provided to the side frame 16b is fixed inside the side frame 16b and an outer end portion extending outside the side frame 16b from the notched portion 16d is coupled to an outer end portion of the outer arc-shaped side frame 33 by a coupling member 35 and is attached to the support frame 32c. The idler roller 11b pivotally supported by the inner side frame 16b of the installation frame body 16 is located at a position almost concentric with the drive roller 10a pivotally supported by the end on the first rotary drive shaft 21 side of the outer arc-shaped side frame 33 of the arc-shaped drive roller array 10. All of the drive rollers 10a and all of the idler rollers 11a, 11b of the arc-shaped conveying device 8 are in contact with a horizontal plane L1 (see FIG. 4) of a constant height together with the drive roller 19a attached to the first rotary drive shaft 21 of the first inner vertically moving conveyance means 19 in the linear conveying device 9.

On the other hand, the drive rollers 10a, 19a, 18a, 20a attached to the first rotary drive shaft 21 and the second rotary drive shaft 23 located at both ends of the constant length straight path section 7, that is, a total of four drive rollers of the drive roller 10a attached to the first rotary drive shaft 21 of the drive rollers 10a of the arc-shaped drive roller array 10, the drive roller 19a attached to the first rotary drive shaft 21 of the drive rollers 19a of the first inner vertically moving conveyance means 19, the drive roller 18a attached to the second rotary drive shaft 23 of the drive rollers 18a of the outer non-vertically-moving conveyance means 18, and the drive roller 20a attached to the second rotary drive shaft 23 of the drive rollers 20a of the second inner vertically moving conveyance means 20 are in contact with the horizontal plane L1 of the constant height, which is a conveyed object supporting and conveying surface in the arc-shaped path section 6.

The rotary cams 29c, 30c of the first support means 29 and the second support means 30 mutually have the same shape and the same size, include a small diameter arc portion 36 extending over approximately 180 degrees and a large diameter arc portion 37 connected to the small diameter arc portion 36 via rising/lowering gradient portions at both ends in the remaining area extending over approximately 180 degrees, and are attached to the third rotary drive shaft 22 in the same phase. The rotary cam 31c of the third support means 31 includes a small diameter arc portion 38 extending over approximately 180 degrees, which is the same as the small diameter arc portions 36 of the rotary cams 29c, 30c, and a large diameter arc portion 39 having a larger diameter than the large diameter arc portions 37 and connected to the small diameter arc portion 38 via rising/lowering gradient portions at both ends in the remaining area extending over approximately 180 degrees. The rotary cam 31c is attached to the third rotary drive shaft 22 in a phase where the vicinities of terminal end portions of the large diameter arc portions 37 in the rotary cams 29c, 30c and the vicinity of a beginning end of the large diameter arc portion 39 in the rotary cam 31c coincide. In the diverging device 2, the rotary cams 29c to 31c on the third rotary drive shaft 22 shown in FIG. 8 to FIG. 10 are rotationally driven in a counterclockwise direction.

Figure 8:
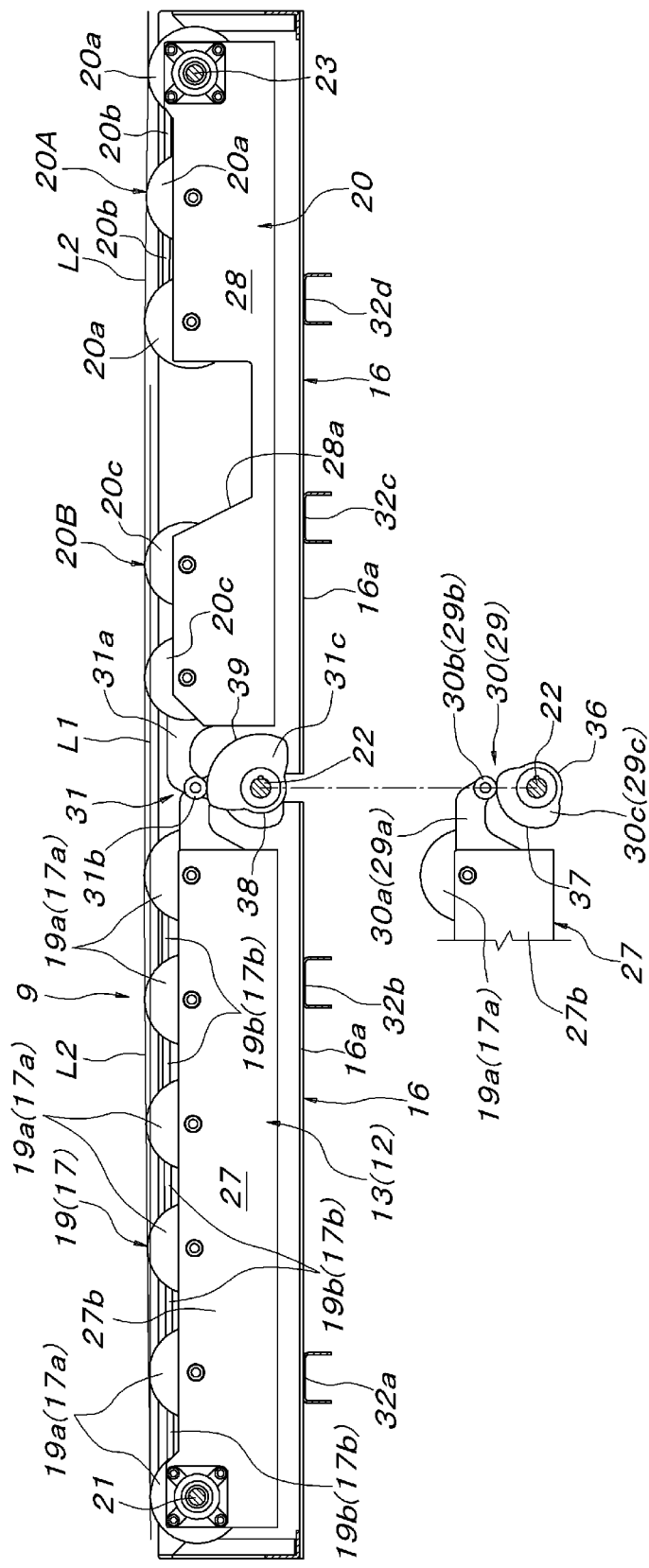
FIG. 8 is a longitudinal sectional side view explaining an inner linear drive conveyor unit switched to an upper working position and support height changeable support means.

As shown in FIG. 8, when the vicinities of the terminal ends of the large diameter arc portions 37 of the rotary cams 29c, 30c of the first support means 29 and the second support means 30 support the cam follower rollers 29b, 30b and the vicinity of the beginning end of the large diameter arc portion 39 of the rotary cam 31c of the third support means 31 supports the cam follower roller 31b, the free end side of the movable frames 27 is raised to the rising limit height via the arms 29a, 30a and the free end side of the movable frame 28 is raised to the rising limit height via the arm 31a. As a result, the outer vertically moving conveyance means 17 in the outer linear drive conveyor unit 12, the first inner vertically moving conveyance means 19 in the inner linear drive conveyor unit 13, and the second inner vertically moving conveyance means 20 in the inner linear drive conveyor unit 13 of the linear conveying device 9 are moved upward with the first rotary drive shaft 21 and the second rotary drive shaft 23 as supporting points and switched to the upper working position, and the free end portions (the inner end portions) are raised to the rising limit height. The phase of the rotary cams 29c to 31c at this time is shown as 0 degrees in FIG. 10.

Figure 3:
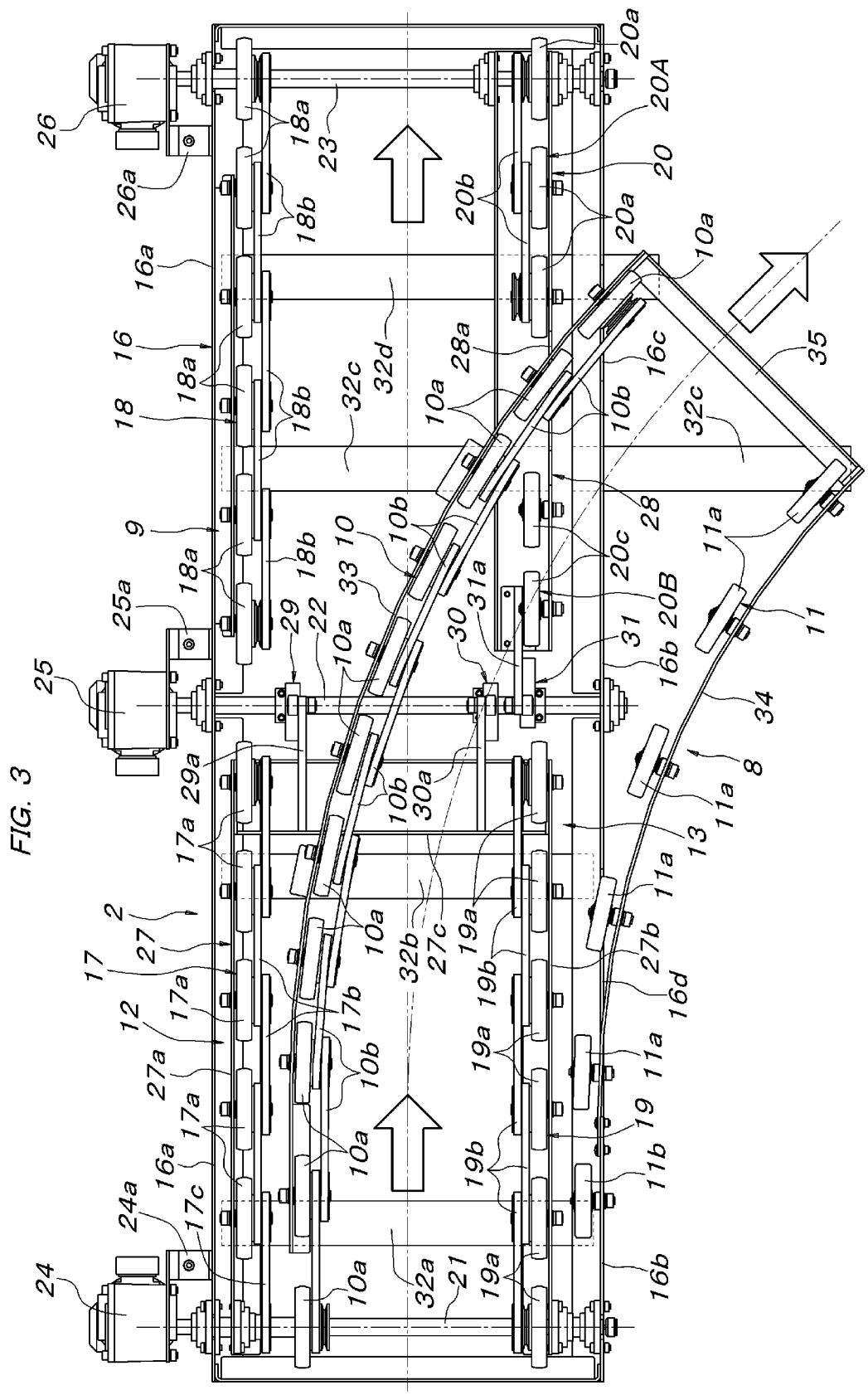
FIG. 3 is an enlarged detailed plan view of the diverging device of FIG. 1.
Figure 4:
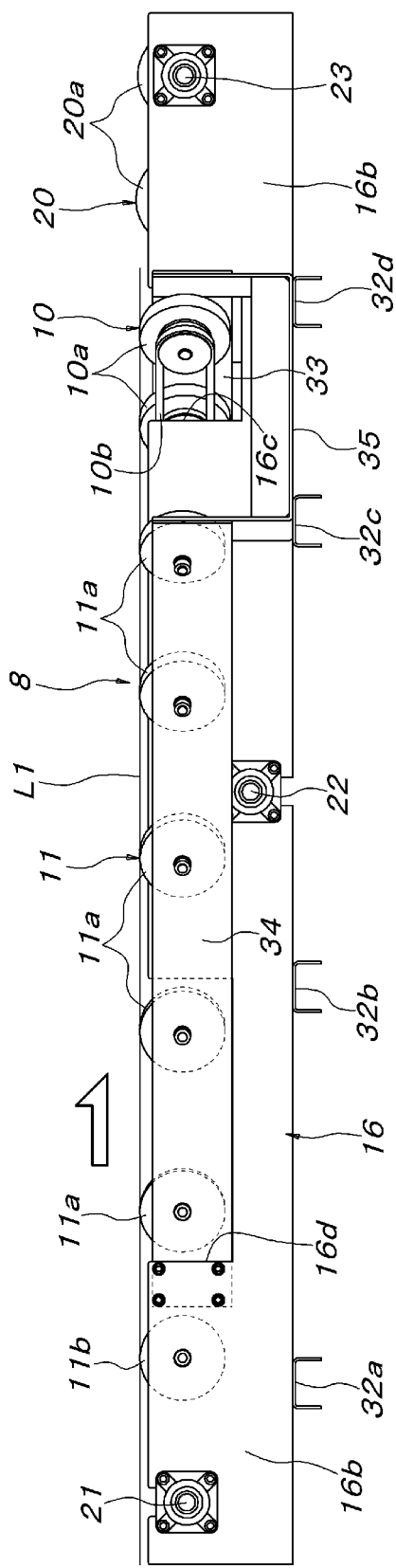
FIG. 4 is a side view of FIG. 3.
Figure 5:
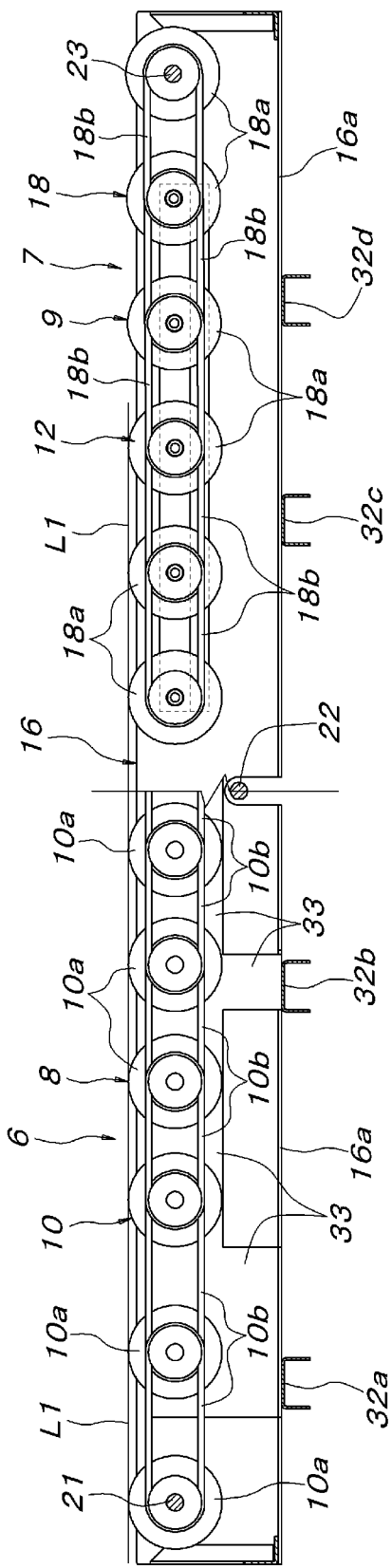
FIG. 5 is a longitudinal sectional side view explaining an outer linear drive conveyor unit of FIG. 3.
Figure 6:
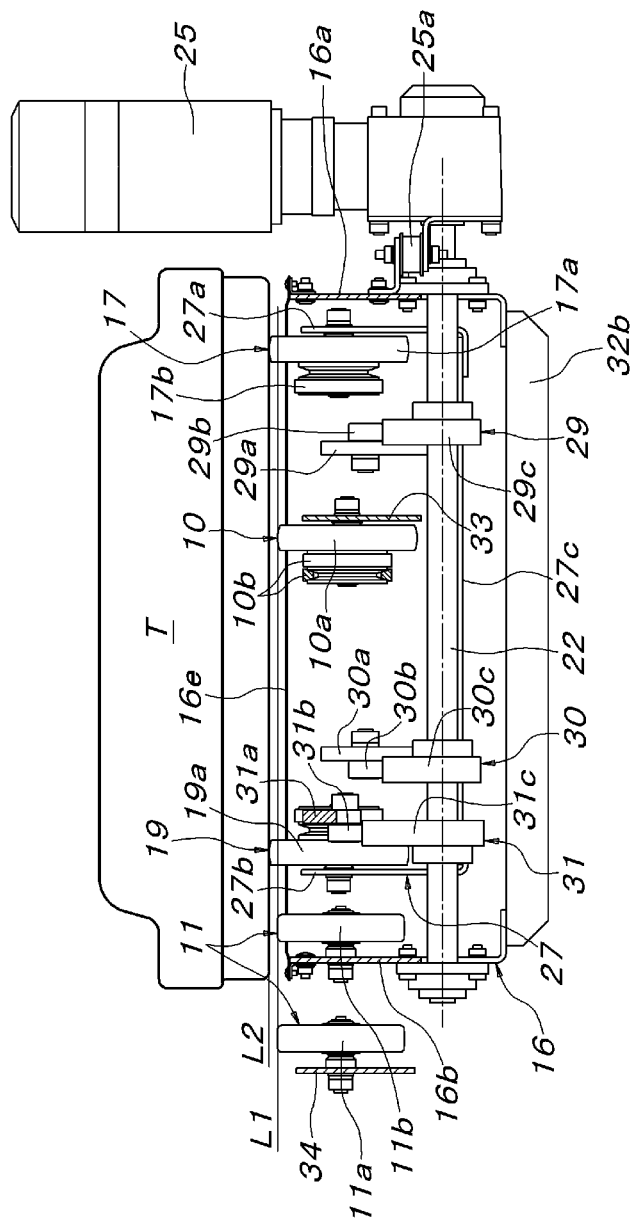
FIG. 6 is a central cross-sectional front view of FIG. 3, showing a state when a tray is made to travel straight ahead along a straight path.
Figure 7:
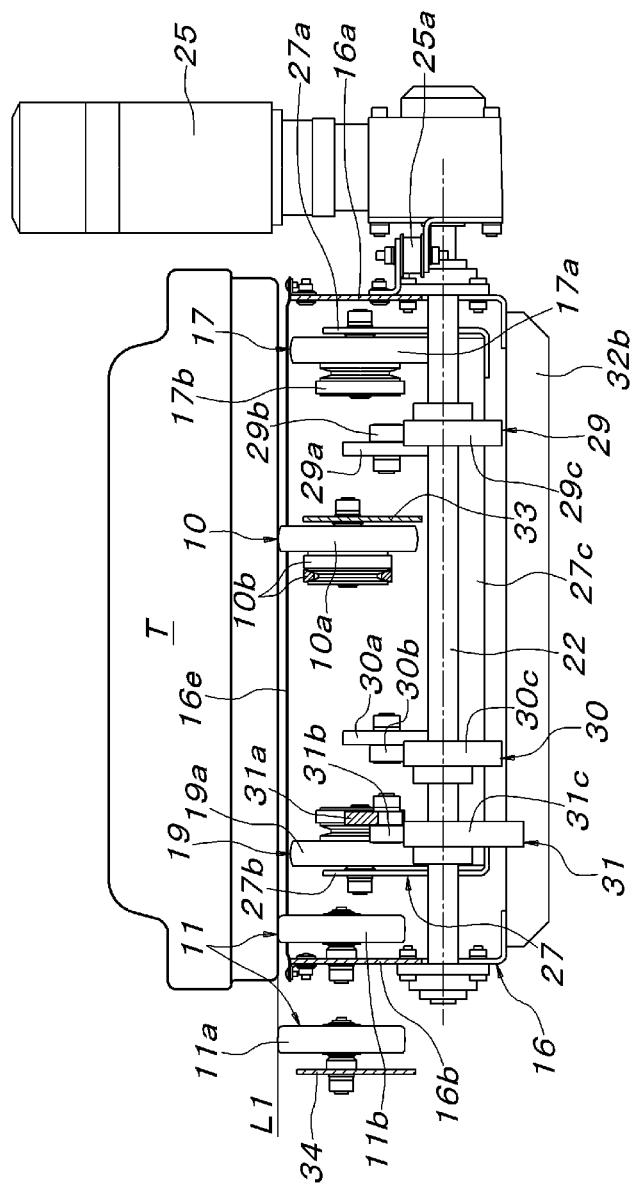
FIG. 7 is a central cross-sectional front view of FIG. 3, showing a state when the tray is made to travel straight ahead along an arc-shaped path section.
Figure 10:
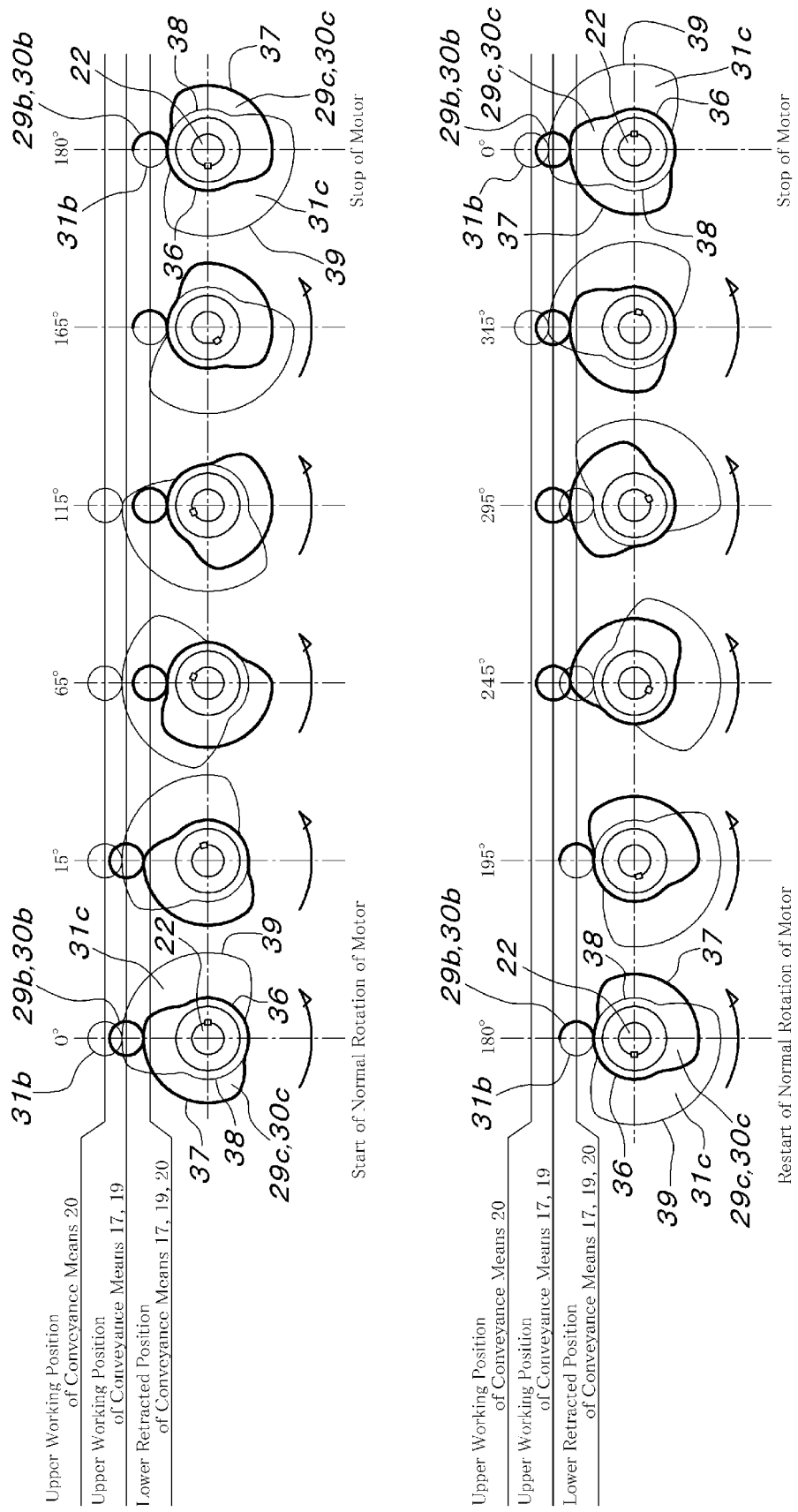
FIG. 10 is a side view explaining the working state of each stage of the support height changeable support means used in the diverging device.

When the phase of the rotary cams 29c to 31c is at 0 degrees of FIG. 10 as described above, as shown in FIG. 8, a conveyed object supporting and conveying surface L2 of the inner linear drive conveyor unit 13 is bent and deformed in a mountain shape in such a manner that a central portion of the conveying path of the inner linear drive conveyor unit 13 is slightly higher than the conveyed object supporting and conveying horizontal plane L1 of the constant height in the arc-shaped path section 6. The outer vertically moving conveyance means 17 in the outer linear drive conveyor unit 12 of the linear conveying device 9 is moved upward with the first rotary drive shaft 21 as the supporting point to the same inclination angle as the first inner vertically moving conveyance means 19 in the inner linear drive conveyor unit 13, is switched into the upper working position, and becomes the same as an upward sloping path section of the front half of the conveyed object supporting and conveying surface L2. As shown in FIG. 1 and FIG. 3, the outer non-vertically-moving conveyance means 18 in the outer linear drive conveyor unit 12 of the linear conveying device 9 is off the arc-shaped path section 6 to the outside. Thus, the entire area of the outer non-vertically-moving conveyance means 18 may be configured in a downward gradient shape that inclines at the same angle as the downward gradient second inner vertically moving conveyance means 20 whose inner end side is raised by the third support means 31 as described above. However, in the present embodiment, as shown in FIG. 5, the front half portion on the inner end side is set at the same level as the conveyed object supporting and conveying horizontal plane L1 of the constant height in the arc-shaped path section 6, and the rear half portion is configured to be a slightly rising gradient to the same level as the drive roller 18a on the second rotary drive shaft 23.

Figure 9:
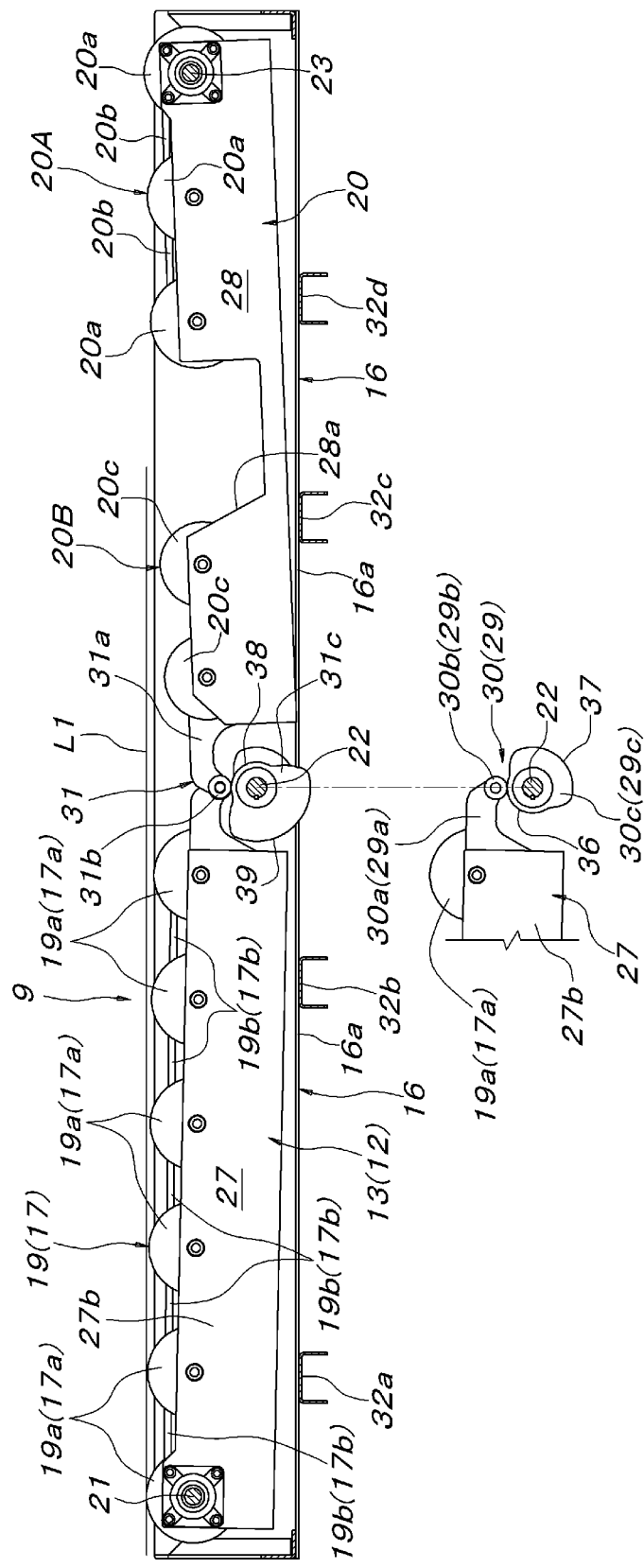
FIG. 9 is a longitudinal sectional side view explaining the inner linear drive conveyor unit switched to a lower retracted position and the support height changeable support means.

Further, in a state in which each rotary cam 29c to 31c is normally rotated 180 degrees from the phase shown in 0 degrees of FIG. 10, as shown in FIG. 9, the vicinities of terminal ends of the small diameter arc portions 36 of the rotary cams 29c, 30c of the first support means 29 and the second support means 30 support the cam follower rollers 29b, 30b, and the vicinity of a beginning end of the small diameter arc portion 38 of the rotary cam 31c of the third support means 31 supports the cam follower roller 31b. As a result, the free end side of the movable frame 27 is lowered to the lowering limit height via the arms 29a, 30a, and the free end side of the movable frame 28 is lowered to the lowering limit height via the arm 31a. Accordingly, the first inner vertically moving conveyance means 19 and the second inner vertically moving conveyance means 20 in the inner linear drive conveyor unit 13 and the outer vertically moving conveyance means 17 in the outer linear drive conveyor unit 12 of the linear conveying device 9 are moved downward with the first rotary drive shaft 21 as the supporting point, switched into the lower retracted position, and deformed in such a manner as to be bent in a valley shape opposite to the inclined state shown in FIG. 8. At this time, the drive rollers 17a of the outer vertically moving conveyance means 17 in the outer linear drive conveyor unit 12 at least located at the area overlapping with the arc-shaped path section 6, the drive rollers 19a of the first inner vertically moving conveyance means 19 in the inner linear drive conveyor unit 13, and the idler rollers 20c and the drive rollers 20a of the second inner vertically moving conveyance means 20 become lower than the conveyed object supporting and conveying horizontal plane L1 of the constant height in the arc-shaped path section 6. Of the drive rollers 19a at the area overlapping with the arc-shaped path section 6, the drive roller 19a attached to the first rotary drive shaft 21 is located at the same level as the conveyed object supporting and conveying horizontal plane L1 of the constant height in the arc-shaped path section 6.

The operation of the diverging device 2 configured as described above will be described. Herein, a tray T molded from a hard material, having a rectangular shape, and loaded with an object is used as the conveyed object to be conveyed. The description is given assuming that each rotary cam 29c to 31c is in the phase shown in 0 degrees of FIG. 10, and the outer vertically moving conveyance means 17, the first inner vertically moving conveyance means 19, and the second inner vertically moving conveyance means 20 in the linear conveying device 9 are in a state of being at the upper working position as shown in FIG. 8, that is, a state in which the tray T is made to travel straight ahead by the linear conveying device 9 (a state in which the arc-shaped conveying device 8 is not working).

The tray T is conveyed toward the diverging device 2 by the outer drive conveyor unit 14 and the inner drive conveyor unit 15 of the straight path 1A. When the tray T is to be diverged from the straight path 1A to another conveying path 3, according to this information, the rotary cams 29c to 31c of the third rotary drive shaft 22 are rotationally driven from 0 degrees, which is the standby position, to 180 degrees in the normal direction as shown in an explanatory drawing from 0 degrees to 180 degrees of FIG. 10, thereby respectively switching the outer vertically moving conveyance means 17, the first inner vertically moving conveyance means 19, and the second inner vertically moving conveyance means 20 in the linear conveying device 9 of the diverging device 2 from the upper working position to the lower retracted position as shown in FIG. 9 and deforming the conveyed object supporting and conveying surface of the linear conveying device 9 in the valley shape in which the central portion becomes lower than the conveyed object supporting and conveying horizontal plane L1 of the arc-shaped path section 6. As a result, the tray T entering the diverging device 2 from the straight path 1A is transferred onto the arc-shaped drive roller array 10 and the arc-shaped idler roller array 11 of the arc-shaped conveying device 8 continuing from the straight path 1A at the same level without being affected by the linear conveying device 9, and is conveyed on the conveyed object supporting and conveying horizontal plane L1 along the arc-shaped path section 6 without changing the height from the straight path 1A at all. The tray T is then sent out onto another conveying path 3 following the arc-shaped path section 6. The rotary cams 29c to 31c are stopped in the 180-degree normal rotation completion state at the upper row of FIG. 10. When the subsequent tray T is to be diverged onto another conveying path 3, the tray T can be diverged into the arc-shaped path section 6 and sent out onto another conveying path 3 as described above if each rotary cam 29c to 31c is kept in a state of being stopped in the 180-degree phase of FIG. 10.

When the tray T being conveyed on the straight path 1A toward the diverging device 2 is not to be diverged into another conveying path 3 but to be made to travel straight ahead on the straight path 1A as it is, according to this information, the rotary cams 29c to 31c of the third rotary drive shaft 22 are rotationally driven from the previous 180-degree normal rotation position to a further 180 degrees in the normal direction and returned to the original phase of 0 degrees as shown in an explanatory drawing from 180 degrees to 0 degrees of FIG. 10, thereby respectively switching the outer vertically moving conveyance means 17, the first inner vertically moving conveyance means 19, and the second inner vertically moving conveyance means 20 in the linear conveying device 9 of the diverging device 2 to the upper working position as shown in FIG. 8 and deforming the conveyed object supporting and conveying surface L2 of the linear conveying device 9 in the mountain shape in which the central portion is higher than the conveyed object supporting and conveying horizontal plane L1 of the arc-shaped path section 6. As a result, the tray T entering the diverging device 2 from the straight path 1A travels straight ahead while slightly rising to around the center of the path length of the linear conveying device 9 by the outer vertically moving conveyance means 17 switched into the upper working position of the outer linear drive conveyor unit 12 and the first inner vertically moving conveyance means 19 switched into the upper working position of the inner linear drive conveyor unit 13 without being affected by the arc-shaped conveying device 8. After that, the tray T travels straight ahead while slightly lowering and reaches the terminal end of the constant length straight path section 7 by the outer non-vertically-moving conveyance means 18 of the outer linear drive conveyor unit 12 and the second inner vertically moving conveyance means 20 switched into the upper working position of the inner linear drive conveyor unit 13. Subsequent thereto, the tray T enters the straight path 1A on the downstream side of the diverging device 2 while traveling straight ahead. Since the rotary cams 29c to 31c are stopped in a state of being returned to 0 degrees of FIG. 10, when the subsequent tray T is to be made to travel straight ahead on the straight path 1A, the tray T is only required to be entered to the diverging device 2 directly without rotationally driving the rotary cams 29c to 31c. When the subsequent tray T is to be diverged into another conveying path 3, the rotary cams 29c to 31c in the 0-degree phase are only required to be normally driven to the 180-degree phase shown in FIG. 10 as described above.

As shown in the explanatory drawing from 0 degrees to 180 degrees at the upper row of FIG. 10, when the rotary cams 29c to 31c are rotationally driven from 0 degrees to 180 degrees in the normal direction to respectively switch the outer vertically moving conveyance means 17, the first inner vertically moving conveyance means 19, and the second inner vertically moving conveyance means 20 from the upper working position to the lower retracted position, the second inner vertically moving conveyance means 20 on the downstream side is switched from the upper working position to the lower retracted position at a final stage of reaching 180 degrees from 165 degrees, whereas the outer vertically moving conveyance means 17 and the first inner vertically moving conveyance means 19 on the upstream side are switched from the upper working position to the lower retracted position at an initial stage of reaching 65 degrees from 15 degrees. This is to avoid an accident that the tray T entering the diverging device 2 comes into contact with the outer vertically moving conveyance means 17 and the first inner vertically moving conveyance means 19 before being completely switched to the lower retracted position, by switching the outer vertically moving conveyance means 17 and the first inner vertically moving conveyance means 19 at the entrance side of the diverging device 2 into the lower retracted position in advance of the second inner vertically moving conveyance means 20 at the exit side of the diverging device 2.

As shown in the explanatory drawing from 180 degrees to 0 degrees at the lower row of FIG. 10, when the rotary cams 29c to 31c are rotationally driven from the 180-degree normal rotation position to a further 180 degrees in the normal direction to respectively switch the outer vertically moving conveyance means 17, the first inner vertically moving conveyance means 19, and the second inner vertically moving conveyance means 20 from the lower retracted position to the upper working position, the second inner vertically moving conveyance means 20 on the downstream side is switched from the lower retracted position to the upper working position at a final stage of reaching 345 degrees from 295 degrees, whereas the outer vertically moving conveyance means 17 and first inner vertically moving conveyance means 19 on the upstream side are switched from the lower retracted position to the upper working position at an initial stage of reaching 245 degrees from 195 degrees. This is to avoid an accident caused by the fact that the switching of the outer vertically moving conveyance means 17 and the first inner vertically moving conveyance means 19 to the upper working position is delayed and the tray T entering the diverging device 2 enters on the arc-shaped conveying device 8 and receives a thrust in a direction along the arc-shaped path section 6, by switching the outer vertically moving conveyance means 17 and the first inner vertically moving conveyance means 19 at the entrance side of the diverging device 2 to the upper working position in advance of the second inner vertically moving conveyance means 20 at the exit side of the diverging device 2.

Figure 11:
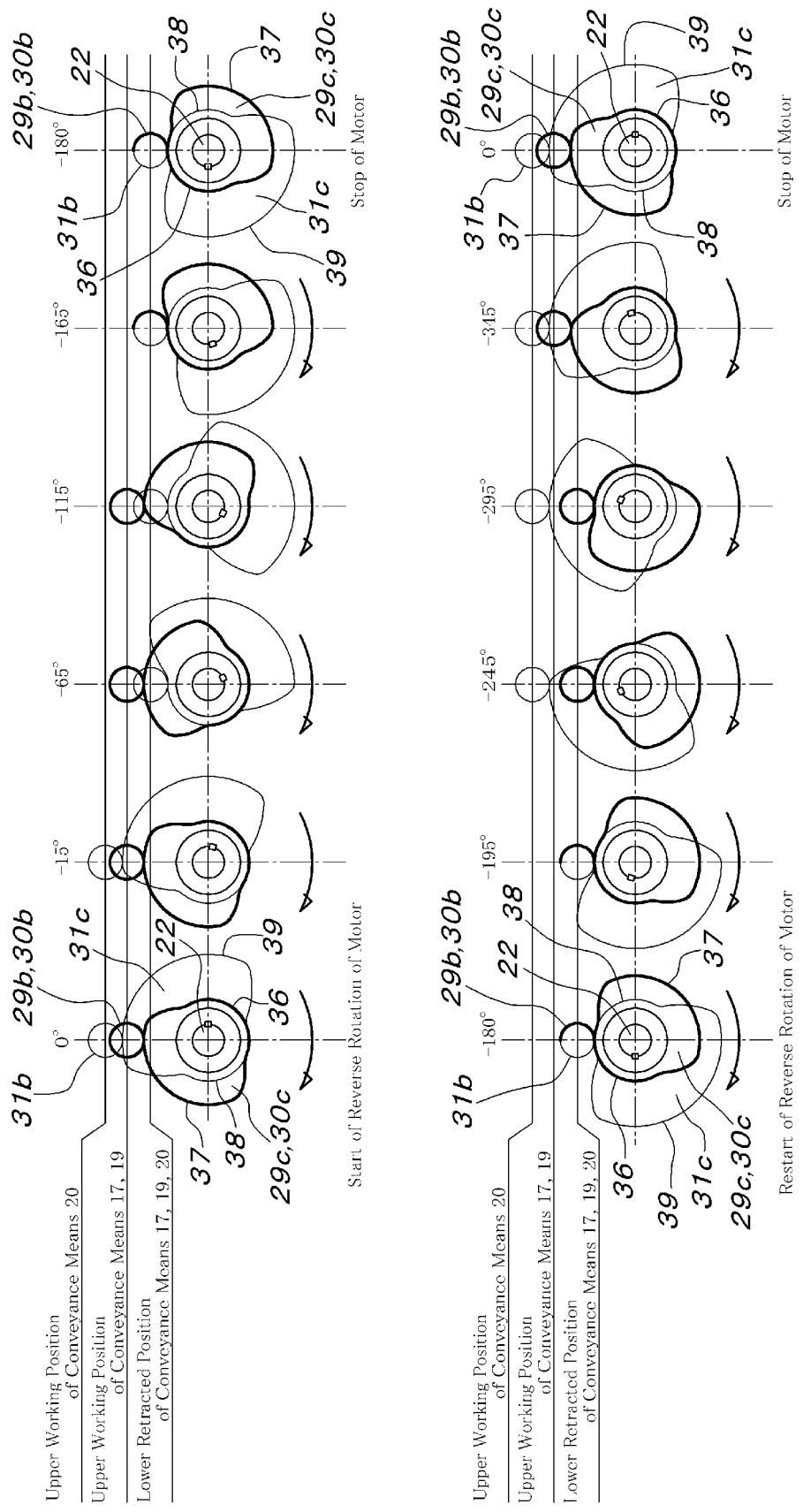
FIG. 11 is a side view explaining the working state of each stage of the support height changeable support means used in the merging device.

As shown in FIG. 1 and FIG. 2, when the configuration of the present invention is applied to the merging device 4, the diverging device 2 described above is used as the merging device 4 as it is, and the tray conveying direction of the arc-shaped conveying device 8 forming the arc-shaped path section 6 and the tray conveying direction of the linear conveying device 9 forming the constant length straight path section 7 are only required to be changed to the opposite directions. In this case, the tray T enters the arc-shaped conveying device 8 forming the arc-shaped path section 6 of the merging device 4 from the side connecting to another conveying path 5, and the tray T enters the linear conveying device 9 forming the constant length straight path section 7 from the side opposite to the side where the connection position P of the arc-shaped path section 6 is located. Therefore, as shown in each drawing of FIG. 11, the effects described above can be obtained in the same way when the rotational drive direction of each rotary cam 29c to 31c by the third rotary drive shaft 22 is changed to the opposite direction. Further, although illustration is omitted in each of the drawings except FIG. 6 and FIG. 7, a cover plate 16e including openings for making top portions of all of the rollers forming the arc-shaped conveying device 8 and the linear conveying device 9 arranged within the installation frame body 16 upwardly project can be attached to the installation frame body 16.

The preferred embodiment of the present invention has been described above. Basically, it is also possible that the outer linear drive conveyor unit 12 of the linear conveying device 9 is replaced with the outer non-vertically-moving conveyance means 18 in the same manner as the inner linear drive conveyor unit 13 to provide a second outer vertically moving conveyance means having a symmetrical structure with the outer vertically moving conveyance means 17. Further, if, with respect to the straight path connected to the end portion on the side, to which the arc-shaped path section 6 is connected, of the constant length straight path section 7, the straight path connected to the other end side can be made higher, the linear conveying device 9 can also be formed of one vertically movable vertically moving conveyance means connected to the end portion on the side, to which the arc-shaped path section 6 is connected, of the constant length straight path section 7. In this case, the vertically moving conveyance means at the upper working position, which becomes higher than the arc-shaped conveying device 8, connects the straight paths of different heights at both front and rear sides of the constant length straight path section 7.

The configuration of the present invention can be utilized as a diverging/merging device capable of stably conveying even a tray having a flat and hard bottom surface without causing the tray to flap at a diverging/merging point in conveying equipment in which an arc-shaped path section at an end portion of another conveying path is tangentially connected in the middle of a straight path.

What is claimed is:

1. A diverging/merging device for conveying equipment comprising:

an arc-shaped path section at an end portion of another conveying path is tangentially connected in a middle of a straight path;

an arc-shaped conveying device forming the arc-shaped path section supports a conveyed object at the same level as the straight path tangentially connected with the arc-shaped path section and is fixed at a constant height so that the conveyed object can be conveyed over an entire area of the arc-shaped path section;

the straight path includes a constant length straight path section including an entirety of an overlapping area with the arc-shaped path section from a connection position with the arc-shaped path section, and a linear conveying device forming the constant length straight path section includes vertically moving conveyance means tilting in a vertical direction with respect to an end portion of the straight path tangentially connected with the arc-shaped path section, and the vertically moving conveyance means supports and conveys the conveyed object;

when the vertically moving conveyance means are at a lower retracted position of tilting downward with respect to the end portion of the straight path, the linear conveying device is located below a conveyed object conveyed by the arc-shaped conveying device;

when the vertically moving conveyance means are at an upper working position of tilting upward with respect to the end portion of the straight path, a conveyed object supported and conveyed by the linear conveying device passes above the arc-shaped conveying device;

the linear conveying device including a first vertically moving conveyance means pivotally supported so as to be capable of tilting in a vertical direction with respect to one end of the constant length straight path section and a second vertically moving conveyance means pivotally supported so as to be capable of tilting in a vertical direction with respect to the other end of the constant length straight path section;

a support height changeable support means that supports a free end portion of the first vertically moving conveyance means and a support height changeable support means that supports the free end portion of the second vertically moving conveyance means;

one drive shaft interlockingly driving the support means that supports the free end portion of the first vertically moving conveyance means and the support means (31) that supports the free end portion of the second vertically moving conveyance means, and when both of the first and second vertically moving conveyance means are switched to an upper working position by rotation of the rotary drive shaft, a conveying surface on the linear conveying device is configured so that the free ends of the first and second vertically moving conveyance means adjacent to each other are deformed in a mountain shape.

2. The diverging/merging device for conveying equipment according to claim 1, wherein:

the first vertically moving conveyance means are formed of an outer vertically moving conveyance means on a side farther from an arc center of the arc-shaped path section and an inner vertically moving conveyance means on a side closer to the arc center;

the second vertically moving conveyance means is formed of an outer non-vertically-moving conveyance means connected to the outer vertically moving conveyance means and an inner vertically moving conveyance means connected to the inner vertically moving conveyance means; and the outer non-vertically-moving conveyance means is fixed at a height such that the outer non-vertically-moving conveyance means is connected to the outer vertically moving conveyance means when at the upper working position.

3. The diverging/merging device for conveying equipment according to claim 2, wherein:

the arc-shaped conveying device is formed of an arc-shaped drive roller array on a side farther from the arc center and an arc-shaped idler roller array on a side closer to the arc center, and the arc-shaped drive roller array has its one end arranged at a position adjacent, on a side where the arc center is located, to one end of the outer vertically moving conveyance means and has its intermediate portion arranged so as to cross an intermediate position of the inner vertically moving conveyance means, and the arc-shaped idler roller array has its one end arranged at a position adjacent, on a side where the arc center is located, to one end of the inner vertically moving conveyance means.

4. The diverging/merging device for conveying equipment according to claim 3, wherein at the connection position, conveyed object support levels of the straight path and the arc-shaped conveying device and the linear conveying device are configured to be the same, and the outer vertically moving conveyance means has one end on the connection position side pivotally supported so as to be vertically movable and the other end supported by a support height changeable first support means, and the inner vertically moving conveyance means has its entire length divided into two parts and is formed of a first inner vertically moving conveyance means on the connection position side and a second inner vertically moving conveyance means on the opposite side, and the first inner vertically moving conveyance means and the second inner vertically moving conveyance means have respective inner end portions adjacent to each other supported by a support height changeable second support means and third support means and have respective outer end portions on the opposite side pivotally supported so as to be vertically movable.

5. The diverging/merging device for conveying equipment according to claim 4, wherein the first support means, the second support means, and the third support means are respectively composed of rotary cams attached to one common drive shaft and cam follower rollers respectively supported by the rotary cams.

6. The diverging/merging device for conveying equipment according to claim 5, wherein to one end on the connection position side of the constant length straight path section, a first driving rotary shaft is supported along a path transverse direction, and to the other end on a side opposite to the connection position side of the constant length straight path section, a second driving rotary shaft is supported in the path transverse direction, and the outer vertically moving conveyance means and the first inner vertically moving conveyance means are supported by the first driving rotary shaft so as to be vertically movable, and the second inner vertically moving conveyance means is supported by the second driving rotary shaft so as to be vertically movable, and drive rollers forming the outer vertically moving conveyance means, drive rollers forming the first inner vertically moving conveyance means, and drive rollers of the arc-shaped drive roller array are interlockingly coupled to the first driving rotary shaft, and drive rollers forming the outer non-vertically-moving conveyance means and drive rollers forming the second inner vertically moving conveyance means are interlockingly coupled to the second driving rotary shaft.

7. The diverging/merging device for conveying equipment according to claim 6, wherein the drive rollers forming the second inner vertically moving conveyance means are provided only outside the arc-shaped drive roller array, and idler rollers are provided at an area inner than the arc-shaped drive roller array of the second inner vertically moving conveyance means.

8. The diverging/merging device for conveying equipment according to claim 6, wherein one end drive roller forming a drive roller array of the first inner vertically moving conveyance means and one end drive roller forming the arc-shaped drive roller array are attached to the first driving rotary shaft, and the drive roller at one end on the connection position side of a drive roller array of the outer vertically moving conveyance means and the idler roller at one end on the connection position side of the arc-shaped idler roller array are separated from the first driving rotary shaft.

9. A diverging/merging device for conveying equipment comprising:
an arc-shaped path section at an end portion of another conveying path is tangentially connected in a middle of a straight path;
an arc-shaped conveying device forming the arc-shaped path section is fixed at a constant height so that a conveyed object can be conveyed over an entire area of the arc-shaped path section at the same level as the straight path tangentially connected with the arc-shaped path section;
the straight path includes a constant length straight path section including an entirety of an overlapping area with the arc-shaped path section from a connection position with the arc-shaped path section, and a linear conveying device forming the constant length straight path section includes vertically moving conveyance means tilting in a vertical direction with respect to an end portion of the straight path tangentially connected with the arc-shaped path section;
when the vertically moving conveyance means are at a lower retracted position of tilting downward, the linear conveying device is located below a conveyed object conveyed by the arc-shaped conveying device;
when the vertically moving conveyance means are at an upper working position of tilting upward, a conveyed object conveyed by the linear conveying device passes above the arc-shaped conveying device;
wherein the linear conveying device includes first vertically moving conveyance means tilting in the vertical direction with respect to one end of the constant length straight path section and a second vertically moving conveyance means tilting in the vertical direction with respect to the other end of the constant length straight path section, and when both the first and second vertically moving conveyance means are at the upper working position, a conveying surface on the linear conveying device is configured to be deformed in a mountain shape in which an intermediate part is raised; and
wherein the linear conveying device is formed of an outer linear drive conveyor unit on a side farther from an arc center of the arc-shaped path section and an inner linear drive conveyor unit on a side closer to the arc center, and the arc-shaped conveying device is formed of an arc-shaped drive roller array on a side farther from the arc center and an arc-shaped idler roller array on a side closer to the arc center, and the arc-shaped drive roller array has its one end arranged at a position adjacent, on a side where the arc center is located, to one end of the outer linear drive conveyor unit and has its intermediate portion arranged so as to cross an intermediate position of the inner linear drive conveyor unit, and the arc-shaped idler roller array has its one end arranged at a position adjacent, on a side where the arc center is located, to one end of the inner linear drive conveyor unit, and the outer linear drive conveyor unit is formed of an outer vertically moving conveyance means forming the area overlapping with the arc-shaped path section and an outer non-vertically-moving conveyance means forming an outside of the area, and the outer non-vertically-moving conveyance means is fixed at a height such that the outer non-vertically-moving conveyance means is connected to the outer vertically moving conveyance means when at the upper working position, and the inner linear drive conveyor unit has its entire length formed of an inner vertically moving conveyance means.

10. The diverging/merging device for conveying equipment according to claim 9, wherein at the connection position, conveyed object support levels of the straight path and the arc-shaped conveying device and the linear conveying device are configured to be the same, and the outer vertically moving conveyance means has one end on the connection position side pivotally supported so as to be vertically movable and the other end supported by a support height changeable first support means, and the inner vertically moving conveyance means has its entire length divided into two parts and is formed of a first inner vertically moving conveyance means on the connection position side and a second inner vertically moving conveyance means on the opposite side, and the first inner vertically moving conveyance means and the second inner vertically moving conveyance means have respective inner end portions adjacent to each other supported by a support height changeable second support means and third support means and have respective outer end portions on the opposite side pivotally supported so as to be vertically movable.

11. The diverging/merging device for conveying equipment according to claim 10, wherein the first support means, the second support means, and the third support means are respectively composed of rotary cams attached to one common drive shaft and cam follower rollers respectively supported by the rotary cams.

12. The diverging/merging device for conveying equipment according to claim 11, wherein to one end on the connection position side of the constant length straight path section, a first driving rotary shaft is supported along a path transverse direction, and to the other end on a side opposite to the connection position side of the constant length straight path section, a second driving rotary shaft is supported in the path transverse direction, and the outer vertically moving conveyance means and the first inner vertically moving conveyance means are supported by the first driving rotary shaft so as to be vertically movable, and the second inner vertically moving conveyance means is supported by the second driving rotary shaft so as to be vertically movable, and drive rollers forming the outer vertically moving conveyance means, drive rollers forming the first inner vertically moving conveyance means, and drive rollers of the arc-shaped drive roller array are interlockingly coupled to the first driving rotary shaft, and drive rollers forming the outer non-vertically-moving conveyance means and drive rollers forming the second inner vertically moving conveyance means are interlockingly coupled to the second driving rotary shaft.

13. The diverging/merging device for conveying equipment according to claim 12, wherein the drive rollers forming the second inner vertically moving conveyance means are provided only outside the arc-shaped drive roller array, and idler rollers are provided at an area inner than the arc-shaped drive roller array of the second inner vertically moving conveyance means.

14. The diverging/merging device for conveying equipment according to claim 12, wherein one end drive roller forming a drive roller array of the first inner vertically moving conveyance means and one end drive roller forming the arc-shaped drive roller array are attached to the first driving rotary shaft, and the drive roller at one end on the connection position side of a drive roller array of the outer vertically moving conveyance means and the idler roller at one end on the connection position side of the arc-shaped idler roller array are separated from the first driving rotary shaft.

* * * * *